J. F. HALSTEAD.
CHUCK.
APPLICATION FILED FEB. 15, 1917.

1,250,864.

Patented Dec. 18, 1917.
2 SHEETS—SHEET 1.

INVENTOR
John F. Halstead
BY
Sydney Prescott
ATTORNEY

J. F. HALSTEAD.
CHUCK.
APPLICATION FILED FEB. 15, 1917.
1,250,864.
Patented Dec. 18, 1917.
2 SHEETS—SHEET 2.
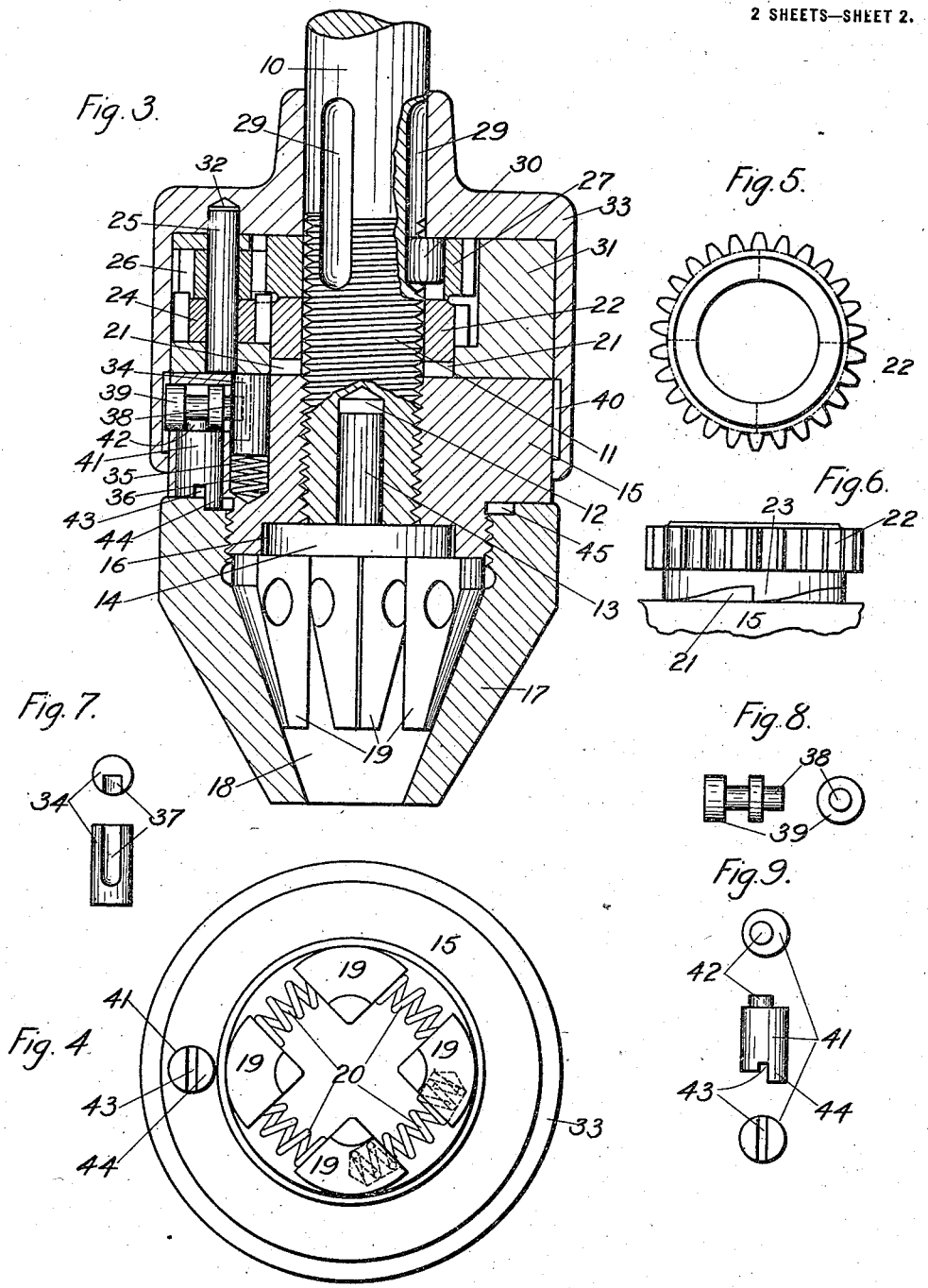
INVENTOR
John F. Halstead
BY
Sydney Prescott
ATTORNEY

UNITED STATES PATENT OFFICE.

JOHN F. HALSTEAD, OF BROOKLYN, NEW YORK, ASSIGNOR TO WAHLSTROM TOOL COMPANY, OF NEW YORK, N. Y., A CORPORATION OF NEW YORK.

CHUCK.

1,250,864.  Specification of Letters Patent.  Patented Dec. 18, 1917.

Application filed February 15, 1917. Serial No. 148,725.

*To all whom it may concern:*

Be it known that I, JOHN F. HALSTEAD, a citizen of the United States, residing at Brooklyn, county of Kings, and State of New York, have invented a new and useful Improvement in Chucks, of which the following is a specification.

This invention relates to chucks, particularly to that type in which the gripping and releasing of a tool may be effected while the chuck is rotating.

Heretofore it has been customary to construct such chucks with a body formed integrally with, or fixed upon to rotate with, the driving shank, which shank is adapted to be held in a drill press or other suitable machine tool. It has been discovered that the gripping and releasing of a tool shank may be effected in a more facile and otherwise better way than heretofore by means of a structure in which the gripping means is operated by a relative movement of the shank and body, and it is one of the objects of the present invention to provide such a structure.

Chucks of the type above referred to have heretofore been provided with a spring for producing movement in one direction to effect the gripping of a tool shank and with a sleeve adapted to be gripped by an operator and stopped temporarily to effect the release of the tool. In such chucks the relative movement of the operating sleeve and the body of the chuck is limited and unless it is released at the end of this relative movement, the operator's hand is liable to injury by abrasion if the surface of the sleeve is roughened to afford a good grasp, or by the heat generated by friction if it is smooth. It has been discovered that this defect of earlier chucks can be overcome by so organizing the operating means that it is free to be held stationary not only during but after the tool releasing operation. It is another object of the present invention to provide such a structure.

With these and other objects not specifically mentioned in view, the invention consists in certain parts, combinations, and constructions which will hereinafter be fully described and then specifically set forth in the claims hereunto appended.

Figure 2:
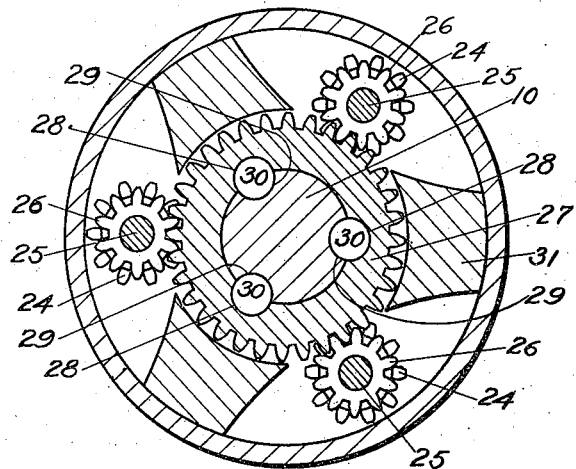
Figure 1:
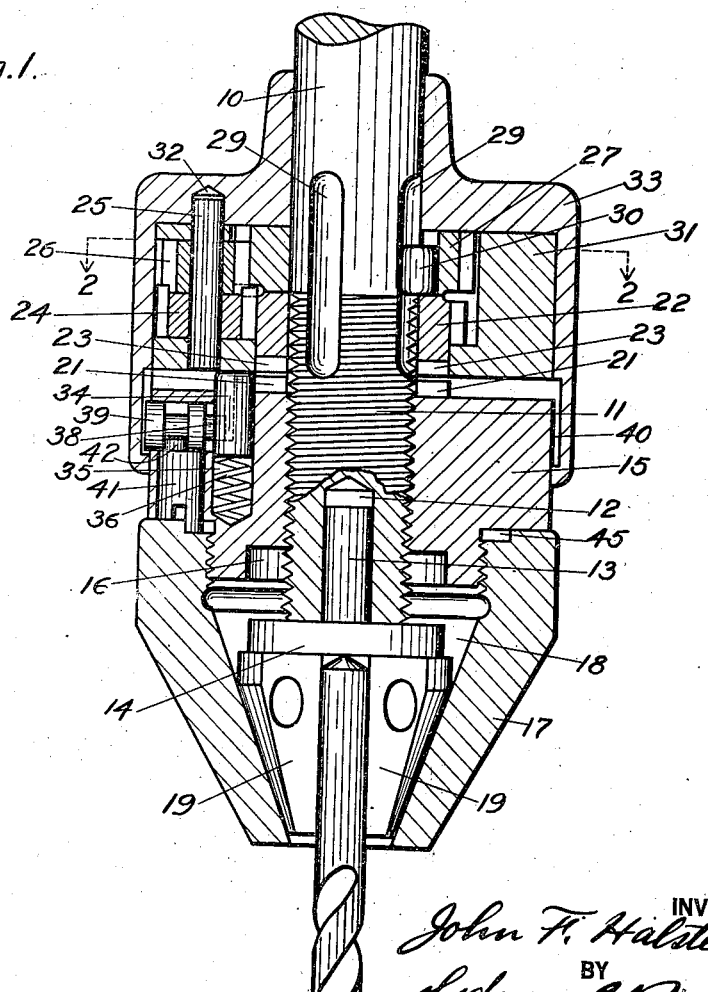

In the accompanying drawings, which form a part of this specification and in which like characters of reference indicate the same or like parts, Figure 1 is a sectional elevation of a structure constructed in accordance with the invention; Fig. 2 is a cross-sectional view taken on the line 2—2 in Fig. 1; Fig. 3 is a sectional elevation of the structure shown in Fig. 1, but with the parts in different position; Fig. 4 is an end view of the structure shown in Fig. 3, with the tapered section of the chuck body omitted; Fig. 5 is a detail plan view of the ultimate driven gear of the train shown in Figs. 1 to 3 inclusive; Fig. 6 is a side elevation of the gear shown in Fig. 5, and a fragment of the chuck body showing the clutch members of the two in engagement; Fig. 7 is a detailed plan and elevation of one of the plungers used for normally keeping the clutch members out of engagement; Fig. 8 is a detail side and end elevation of a locking plunger used to hold certain parts of the chucks together but adapted to permit a limited relative movement thereof; and Fig. 9 is an elevation and two end views of a retainer for the plunger shown in Fig. 8.

In carrying the invention into effect, there is provided a driving shank, a body supported by and normally rotating with said shank, tool gripping means carried by said body, and means for producing a relative movement of said shank and said body whereby the gripping means is operated to release the tool. In the best constructions, the body is threaded upon the driving shank, and the movement whereby the gripping means is operated to release the tool is a relative threaded movement. In the best constructions also, the movement whereby the gripping means is operated to release the tool is an accelerated movement; that is to say, the body during the releasing operation is caused to rotate at a greater speed than that of the driving shank, and in the best constructions this accelerated movement is produced by means of a train of gearing. In the best constructions also, this train of gearing is normally out of engagement with the clutch body, and means are provided whereby it may be thrown into engagement therewith to effect the release of the tool. In the best constructions also, this means includes an operating member which normally rotates with the driving shank but is arranged and adapted to be stopped and held stationary during and after the tool releasing operation. In the best constructions also, the body is formed of two sections, the lower section being tapered and containing a plurality of floating jaws normally held in open position by means of a series of springs, the gripping of the tool being effected by stoppage of the lower section of the body which produces a relative movement of the body and the driving shank, this relative movement resulting in forcing the gripping jaws together to seize and hold the tool shank. In the best constructions also, means are provided for clutching the accelerating gearing to the body at the proper time, and further means are provided for locking the parts together but permitting a limited relative declutching movement of the same.

The device selected to illustrate the invention is but one of many possible concrete embodiments of the same. The invention therefore is not to be restricted to the precise details of the structure shown and described.

Referring to the drawings, 10 indicates a driving shank, the upper end of which is adapted to be clamped in a drill press or other suitable machine tool. The lower end of this driving shank is provided with a thread 11 and with an axial aperture 12. Loosely mounted within this aperture 12 is a stem 13 formed integrally on a disk 14, the purpose of which will be presently explained. Threaded upon the threaded end 11 of the driving shank 10 is the upper section 15 of a chuck body, this section being free—by reason of its threaded engagement with the driving shank 10, to rotate with respect to said shank; and it is of course obvious that in so rotating it will travel up or down the driving shank in accordance with the direction of the relative movement of the two. The upper section 15 of the chuck body is provided with a counter-bore 16 in its lower face which is adapted to house the disk 14 when the chuck is open, as clearly shown in Fig. 3. Threaded to the upper section 15 of the chuck body is a lower tapered section 17 which is provided with a tapered bore 18. Within this tapered bore are mounted four tool shank gripping jaws 19 floating within the bore and normally held in expanded position by means of springs 20, this construction of the floating jaws being old and well known in the art. By an inspection of Figs. 1 and 3, it will be understood that the disk 14 before referred to contacts with the upper ends of these gripping jaws 19 and serves to insure uniform movement of the same during their movement.

The upper section 15 of the chuck body is provided with an integral clutch member 21. Mounted above the upper section 15 of the chuck body and surrounding the driving shank 10 is a driven gear 22 provided with a clutch member 23, the latter being adapted at the proper time to engage the clutch member 21 of the body section 15. The driven gear 22 is in mesh with a series of pinions 24, each loosely mounted upon a stud 25. Also mounted upon each of the studs 25 is a smaller pinion 26. The pinion 24 is counter-bored, as clearly shown in Fig. 3, and the pinion 26 has the same number of teeth of a smaller pitch, these teeth being designed to fit in between the teeth of the pinion 24, so that the one pinion will drive the other. The pinion 26 drives the pinion 24 and is itself driven by a driving gear 27. This driving gear is provided with three recesses 28, and the driving shank 10 is provided with three similar but elongated recesses 29. Mounted in these recesses is a series of short cylinders 30 which serve to lock the driving shank 10 and driving gear 27 together for rotation but permit relative longitudinal movement of the two. The studs 25 before referred to are mounted in suitable apertures in a housing 31 which incloses the gearing. The upper ends of the studs 25 project into suitable apertures 32 formed in a sleeve 33, which is the tool releasing operating sleeve of the device. The clutch members 21 and 23 are normally held out of engagement by means of a plunger 34 which is loosely mounted in a suitable aperture 35 bored in the body section 15. This plunger is pressed upwardly by means of a spring 36, the upper end of the plunger bearing against the housing 31 before referred to, and operating to lift and hold it high enough to keep the clutch members out of engagement under normal conditions; that is to say, when the chuck is at work driving a drill or other tool. The plunger 34 is provided with a longitudinal recess 37 which is engaged by the operating nose 38 of a locking plunger 39, which plunger is mounted in a radial aperture bored in the body section 15 before referred to. The locking plunger 39 projects slightly beyond the periphery of the body section 15, and the sleeve 33 is provided with an annular recess 40 into which the end of this locking plunger 39 projects. The width of the annular recess 40 is such that only a limited relative longitudinal movement of the body section 15 of the operating sleeve 33 is possible. The locking plunger 39 is held in operative position by means of a retainer 41 mounted in a suitable bore in the body section 15, which opens into the radial bore in which the plunger 39 is located. The retainer 41 is provided at one end with an eccentric nose 42 which engages a channel cut in the body of the locking plunger 39. The opposite end of the retainer 41 is provided with a screw slot 43 and a long leg 44. The long leg 44 of the retainer engages the wall of a counter-bore 45 formed in the upper face of the lower tapered section 17 of the body. This engagement prevents it from turning and thereby prevents the locking plunger 39 from being accidentally displaced.

The operation of the device is as follows: Assuming that the chuck is mounted in a drill press and is rotating with the parts in the position shown in Fig. 3, the operator inserts the shank of a drill or other tool between the gripping jaws; and with the thumb and fore-finger of the hand in which he holds said tool, seizes the tapered lower section 17 of the body, stopping the same. The stoppage of the lower section 17 of course results in stoppage of the upper section 15 which is threaded upon the driving shank 10. As the driving shank continues to rotate, it is screwed into the stopped body and the body travels upward on the shank. The disk 14, however, does not travel up with the body, but holds the gripping jaws 19 against longitudinal movement. As the body moves upward on the thread of the driving shank, the tapered bore 18 of the tapered section 17 forces the gripping jaws together until they reach the position shown in Fig. 1, and seize the tool shank. As soon as this seizure takes place, the parts will be locked together and the chuck body will begin to slip in the operator's hand. This indicates to him that the tool is firmly gripped and he at once lets go. The tendency of the driving shank, threaded as it is into the body, is of course to jam the gripping jaws more firmly upon the tool shank as the resistance of the work increases, so that there can be no slip of the tool. It will of course be understood that during this upward movement of the body, the gearing, its housing, and the operating sleeve 33 are also moved upward along the shank by the thrust of the plunger 34 moving with the body. It will now be understood that by this construction the operator is enabled to insert a tool in the chuck and effect its clamping by one hand, leaving the other free for other purposes.

While the chuck is at work rotating a tool, the gearing, its housing, and the sleeve rotate idly with it. When it is desired to release the tool, the operator grasps the operating sleeve 33, stops it and presses it downwardly. The stoppage of the sleeve 33, and the housing 31 to which it is secured, sets the train of gearing in motion and the ratio of the gears is such that the driven gear 22 is moved in the same direction as the driving gear 27, but at a higher speed. By pressing downward upon the sleeve 33, the plunger 34 is depressed against the action of the spring 36 and the clutch members 23 are thrown into engagement with the clutch members 21 of the body section 15. The body section is then clutched to the driven gear 22 which is then rotating in the same direction as the driving shank but at accelerated speed. This clutch engagement results in accelerating the movement of the body 15—17, and the body then travels down the driving shank by reason of its threaded engagement therewith, and in so moving permits the springs 20 to force the gripping jaws 19 apart, thereby releasing the tool. The operator may let go of the sleeve 33 as soon as the drill or other tool is released but no harm can result if he fails to do this. If he still holds the sleeve 33, the relative movement of the body and driving shank will continue until the parts reach the position shown in Fig. 3. By an inspection of this figure, it will be seen that the cylinders 30 have then reached their lowermost position in the shank recesses 29 and are in engagement with the hub of the sleeve 33, so that their downward travel is stopped and the downward travel of the sleeve 33 is also stopped. The body, however, will continue to travel downward until the clutch members 21 and 23 have been disengaged by this continued downward movement. As soon as the clutch members are thus disengaged, the relative movement of the chuck body and the shank will cease and they will rotate together. It will of course be understood that the clutch members 21 and 23 are then disengaged and when the operating sleeve 33 is still held, the gearing will be moving but it will be idle movement because it is out of engagement with the clutch body.

To take the device apart, the lower tapered section 17 is first unscrewed from the body section 15. The retainer 41 may then be turned to cause its eccentric nose to force the locking plunger deeper in the groove 37 of the plunger 34. The sleeve 33, the housing 31, and the train of gears may then be slipped off of the shank, and when this is done the plunger 34, the locking plunger 39, and the retainer 41 may be readily slipped out of the body section 15, which in turn may readily be unscrewed from the driving shank. It will be understood that the parts may be again assembled by a reverse order of operation.

What is claimed is:

1. In a chuck, the combination with a driving shank, of a body supported by and normally rotating with said shank, tool gripping means comprising operative connections and a clutch mechanism carried by said body, and means comprising operative connections and a clutch mechanism for producing a relative movement of said shank and said body whereby the gripping means is operated to release the tool.

2. In a chuck, the combination with a driving shank, of a body threaded on and normally rotating with said shank, tool gripping means comprising operative connections and a clutch mechanism carried by said body, and means comprising operative connections and a clutch mechanism for producing a relative threading movement of said shank and said body whereby the gripping means is operated to release the tool.

3. In a chuck, the combination with a driving shank, of a body supported by and normally rotating with said shank, tool gripping means comprising operative connections and a clutch mechanism carried by said body, and means comprising operative connections and a clutch mechanism for producing an accelerated movement of said body with respect to said shank whereby the gripping means is operated to release the tool.

4. In a chuck, the combination with a driving shank, of a body threaded on and normally rotating with said shank, tool gripping means comprising operative connections and a clutch mechanism carried by said body, and means comprising operative connections and a clutch mechanism for producing an accelerated threading movement of said body and said shank whereby the gripping means is operated to release the tool.

5. In a chuck, the combination with a driving shank, of a body supported by and normally rotating with said shank, a plurality of tool gripping jaws carried by said body, and means comprising operative connections and a clutch mechanism for producing a relative movement of said shank and said body whereby the gripping jaws are operated to release the tool.

6. In a chuck, the combination with a driving shank, of a body supported by and normally rotating with said shank, a plurality of spring controlled floating tool gripping jaws carried by said body, and means comprising operative connections and a clutch mechanism for producing a relative movement of said shank and said body whereby the gripping jaws are operated to release the tool.

7. In a chuck, the combination with a driving shank, of a body supported by and normally rotating with said shank, tool gripping means comprising operative connections and a clutch mechanism carried by said body, and means comprising operative connections and a clutch mechanism carried by and normally rotating with said shank adapted to be operated for producing a relative movement of said shank and said body whereby the gripping means is operated to release the tool.

8. In a chuck, the combination with a driving shank, of a body supported by and normally rotating with said shank, tool gripping means carried by said body, and means comprising a clutch mechanism and gearing carried by and normally rotating with said shank adapted to be operated for producing an accelerated movement of said body with respect to said shank whereby the gripping means is operated to release the tool.

9. In a chuck, the combination with a driving shank, of a body threaded on and normally rotating with said shank, tool gripping means comprising a clutch mechanism and operative connections carried by said body, and means operated by and normally rotating with but axially movable on said shank and adapted to be operated for producing an accelerated threading movement of said body with respect to said shank whereby the gripping means is operated to release the tool.

10. In a chuck, the combination with a driving shank, of a body supported by and normally rotating with said shank, tool gripping means carried by said body, and means comprising a clutch mechanism and gearing carried by and normally rotating with said shank but out of engagement with said body and adapted to be thrown into engagement with said body for producing an accelerated movement of said body with respect to said shank whereby the gripping means is operated to release the tool.

11. In a chuck, the combination with a driving shank, of a body supported by and normally rotating with said shank, tool gripping means carried by said body, clutch mechanism one member of which is formed on said body, and gearing carried by and normally rotating with said shank and provided with a clutch member adapted to engage the body clutch member for producing an accelerated movement of said body with respect to said shank whereby the gripping means is operated to release the tool.

12. In a chuck, the combination with a driving shank, of a body supported by and normally rotating with said shank, tool gripping means carried by said body, clutch mechanism one member of which is formed on said body, gearing carried by and normally rotating with said shank and provided with a clutch member adapted to engage the body clutch member for producing an accelerated movement of said body with respect to said shank whereby the gripping means is operated to release the tool, and an operating member engaging said gearing.

13. In a chuck, the combination with a driving shank, of a body supported by and normally rotating with said shank, tool gripping means carried by said body, clutch mechanism one member of which is formed on said body, gearing carried by and normally rotating with said shank and provided with a clutch member adapted to engage the body clutch member for producing an accelerated movement of said body with respect to said shank whereby the gripping means is operated to release the tool, and an operating sleeve engaging and inclosing said gearing.

14. In a chuck, the combination with a driving shank, of a body supported by and normally rotating with said shank, tool gripping means carried by said body, clutch mechanism one member of which is formed on said body, gearing carried by and normally rotating with said shank and provided with a clutch member adapted to engage the body clutch member for producing an accelerated movement of said body with respect to said shank whereby the gripping means is operated to release the tool, and means for locking together but permitting a limited relative declutching movement of said body and said gearing.

15. In a chuck, the combination with a driving shank, of a body supported by and normally rotating with said shank, tool gripping means carried by said body, clutch mechanism one member of which is formed on said body, gearing carried by and normally rotating with said shank and provided with a clutch member adapted to engage the body clutch member for producing an accelerated movement of said body with respect to said shank whereby the gripping means is operated to release the tool, and means for normally holding said clutch members out of engagement.

16. In a chuck, the combination with a driving shank, of a body supported by and normally rotating with said shank, tool gripping means carried by said body, clutch mechanism one member of which is formed on said body, gearing carried by and normally rotating with said shank and provided with a clutch member adapted to engage the body clutch member for producing an accelerated movement of said body with respect to said shank whereby the gripping means is operated to release the tool, and a series of spring pressed plungers adapted to normally hold said clutch members out of engagement.

17. In a chuck, the combination with a driving shank, of a body supported by and normally rotating with said shank, tool gripping means carried by said body, clutch mechanism one member of which is formed on said body, gearing carried by and normally rotating with said shank and provided with a clutch member adapted to engage the body clutch member for producing an accelerated movement of said body with respect to said shank whereby the gripping means is operated to release the tool, means for normally holding said clutch member out of engagement, and means for locking together but permitting a limited relative movement of said body and said gearing.

18. In a chuck, the combination with a driving shank, of a body supported by and normally rotating with said shank, tool gripping means comprising operative connections and a clutch mechanism carried by said body, means comprising operative connections and a clutch mechanism for producing a relative movement of said shank and said body whereby the gripping means is operated to release the tool said means being mounted on and to normally rotate with said shank but free to be held stationary during and after the tool releasing operation.

19. In a chuck, the combination with a driving shank, of a body supported by and normally rotating with said shank and provided with tool gripping means comprising operative connections and a clutch mechanism, and tool releasing means comprising operative connections and a clutch mechanism mounted on and to normally rotate with said shank but free to be held stationary during and after the tool releasing operation.

20. In a chuck, the combination with a driving shank, of a body supported by and normally rotating with said shank and provided with tool gripping means, and tool releasing means including operating connections, a clutch mechanism and a sleeve mounted on and to normally rotate with said shank said sleeve being free to be held stationary during and after the tool releasing operation.

21. In a chuck, the combination with a driving shank, of a body supported by and normally rotating with but capable of movement on said shank said body having a tapered lower section, tool gripping means carried within said section, means whereby stoppage of the tapered section of the body produces a relative movement of the body and shank to effect the clamping of the tool by the tool gripping means comprising operative connections and a clutch mechanism, and means for producing a reverse relative movement of said shank and said body whereby the gripping means is operated to release the tool.

22. In a chuck, the combination with a driving shank, of a body supported by and normally rotating with but capable of movement on said shank said body having a tapered lower section, tool gripping means carried within said section, means whereby stoppage of the tapered section of the body produces a relative movement of the body and shank to effect the clamping of the tool by the tool gripping means, and means independent of the tapered section of the body and comprising a clutch mechanism and operative connections for producing a reverse relative movement of said shank and said body whereby the gripping means is operated to release the tool.

23. In a chuck, the combination with a driving shank, of a body threaded on and normally rotating with said shank and having a tapered lower section, tool gripping means carried within said section, means whereby stoppage of the tapered section of the body produces a relative threading movement of the body and shank to effect the clamping of a tool by the tool gripping means, and means comprising operative connections and a clutch mechanism for producing a reverse relative threading movement of said shank and body whereby the gripping means is operated to release the tool.

24. In a chuck, the combination with a driving shank, of a body supported by and normally rotating with said shank and provided with a clutch member, tool gripping means carried by said body, gearing carried by and normally rotating idly with said shank the driving member of said gearing being splined to the driving shank and the ultimate driven member being provided with a clutch member, and means for causing the engagement of said clutch members to produce an accelerated movement of said body with respect to said shank whereby the gripping means is operated to release the tool.

25. In a chuck, the combination with a driving shank, of a body supported by and normally rotating with said shank and provided with a clutch member, tool gripping means carried by said body, gearing carried by and normally rotating idly with said shank the driving member of said gearing being provided with a clutch member, a housing for the gearing, and a sleeve surrounding and movable with said housing and adapted for causing the engagement of said clutch members to produce an accelerated movement of said body with respect to said shank whereby the gripping means is operated to release the tool.

26. In a chuck, the combination with a driving shank provided with a plurality of grooves and threaded end beyond the grooves, of a body threaded upon the driving shank beyond the grooves and provided with a clutch member, tool gripping means carried by said body, gearing carried by and normally rotating idly with said shank the driving member of said gearing being splined to the shank grooves and the ultimate driven member being loosely mounted upon said shank and provided with a clutch member, means for normally holding the clutch members out of engagement, a housing for the gearing, and a sleeve surrounding and movable with the housing and adapted to be manually stopped and pressed downward for causing the engagement of the clutch members to produce an accelerated movement of said body with respect to said shank whereby the gripping means is operated to release the tool.

In testimony whereof, I have signed my name to this specification.

JOHN F. HALSTEAD.

Copies of this patent may be obtained for five cents each, by addressing the "Commissioner of Patents Washington, D. C."